United States Patent
Kajiwara et al.

(10) Patent No.: US 11,302,951 B2
(45) Date of Patent: Apr. 12, 2022

(54) ELECTRODE AND REDOX FLOW BATTERY

(71) Applicant: TORAY INDUSTRIES, INC., Tokyo (JP)

(72) Inventors: Kentaro Kajiwara, Otsu (JP); Masamichi Utsunomiya, Otsu (JP); Fumitaka Watanabe, Otsu (JP); Yasuaki Tanimura, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 208 days.

(21) Appl. No.: 16/342,795

(22) PCT Filed: Nov. 30, 2017

(86) PCT No.: PCT/JP2017/042992
§ 371 (c)(1),
(2) Date: Apr. 17, 2019

(87) PCT Pub. No.: WO2018/101388
PCT Pub. Date: Jun. 7, 2018

(65) Prior Publication Data
US 2019/0312295 A1    Oct. 10, 2019

(30) Foreign Application Priority Data
Dec. 1, 2016  (JP) ................. JP2016-233897

(51) Int. Cl.
*H01M 8/18*       (2006.01)
*H01M 4/86*       (2006.01)
*H01M 4/96*       (2006.01)

(52) U.S. Cl.
CPC ............. *H01M 8/188* (2013.01); *H01M 4/86* (2013.01); *H01M 4/8626* (2013.01); *H01M 4/96* (2013.01); *H01M 8/18* (2013.01); *Y02E 60/50* (2013.01)

(58) Field of Classification Search
CPC .......... H01M 8/188; H01M 8/18; H01M 4/86; H01M 4/8626; H01M 4/96
See application file for complete search history.

(56) References Cited

U.S. PATENT DOCUMENTS

2015/0118550 A1* 4/2015 Shon .................. H01M 4/96
429/210
2015/0295247 A1 10/2015 Kumbur et al.
(Continued)

FOREIGN PATENT DOCUMENTS

CN         104577148 A    4/2015
EP         3 088 582 A1   11/2016
(Continued)

OTHER PUBLICATIONS

Dennison et al., "Enhancing Mass Transport in Redox Flow Batteries by Tailoring Flow Field and Electrode Design," Nov. 17, 2015, Journal of the Electrochemical Society, 163, A5163-A5169. (Year: 2015).*

(Continued)

*Primary Examiner* — Matthew W Van Oudenaren
(74) *Attorney, Agent, or Firm* — Birch, Stewart, Kolasch & Birch, LLP

(57) ABSTRACT

The purpose of the present invention is to provide an electrode which is used as a liquid flow-through device electrode and in which liquid flow-through resistance is reduced and the utilization efficiency of carbon fiber is enhanced. Another object of the present invention is to provide a redox flow battery having excellent charge-discharge performance by use of the electrode which is used for the liquid flow-through device. The present invention provides an electrode for a liquid flow-through device, the electrode essentially consisting of a carbon fiber nonwoven fabric, having a thickness of more than 0.40 mm, and having a through-hole disposed therein, or a non-through-hole disposed on one surface or both surfaces of the electrode.

12 Claims, 1 Drawing Sheet

(56) References Cited

U.S. PATENT DOCUMENTS

2016/0322646 A1* 11/2016 Kajiwara ............... H01M 4/96
2018/0159163 A1    6/2018 Hanafusa et al.

FOREIGN PATENT DOCUMENTS

| JP | 64-41167 A | | 2/1989 |
|----|------------|---|--------|
| JP | 2-148658 A | | 6/1990 |
| JP | 2005-158409 A | | 6/2005 |
| JP | 2005158409 | * | 6/2005 |
| JP | 2013-144857 A | | 7/2013 |
| JP | 2015-143405 A | | 8/2015 |
| JP | 2016-85902 A | | 5/2016 |
| WO | WO2015098530 | * | 7/2015 |
| WO | WO 2016/189970 A1 | | 12/2016 |

OTHER PUBLICATIONS

International Search Report, issued in PCT/JP2017/042992, PCT/ISA/210, dated Feb. 27, 2018.
Written Opinion of the International Searching Authority, issued in PCT/JP2017/042992, PCT/ISA/237, dated Feb. 27, 2018.
Office Action dated Dec. 25, 2019, in Chinese Patent Application No. 201780074600.4.
Extended European Search Report dated Sep. 1, 2020, in European Patent Application No. 17875579.9.

* cited by examiner

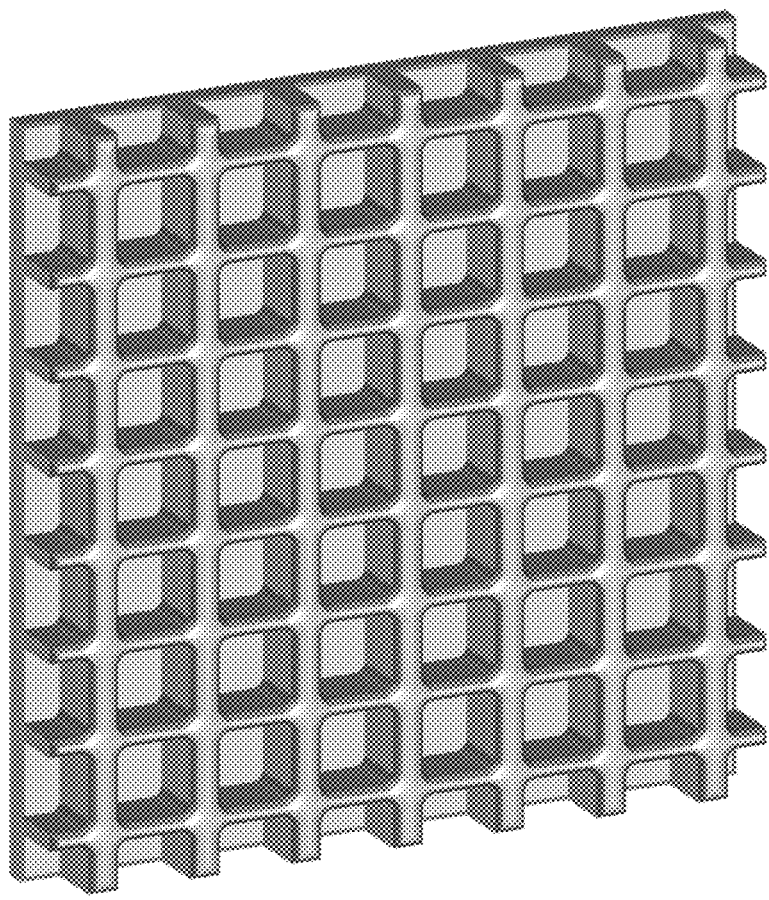

ELECTRODE AND REDOX FLOW BATTERY

TECHNICAL FIELD

The present invention relates to an electrode and a redox flow battery.

BACKGROUND ART

Liquid flow-through devices such as electrodialysis devices for desalination, salt formation or ion separation, water electrolysis devices for obtaining hydrogen, fuel cells used for power generation, and secondary batteries such as redox flow batteries are used in various fields, and required to have higher performance.

Redox flow batteries, which are a type of liquid flow-through devices, are expected to come into wide use as storage batteries for stabilizing electric power systems by storing and discharging electric power generated in wind power generation and solar power generation because it is easy to increase or decrease the energy capacity, and the batteries have a long life, and allow the battery charge state to be known.

The redox flow battery is a battery in which in at least one of a positive electrode and a negative electrode, an electrolytic solution containing an active material is supplied to perform charge and discharge through oxidation-reduction reaction. Examples of the active material that is used include ions of vanadium, halogens, iron, zinc, sulfur, titanium, copper, chromium, manganese, cerium, cobalt, lithium and the like, compound ions thereof, and nonmetallic quinone-based compound ions and aromatic compound ions.

The charge-discharge performance of a redox flow battery is known to considerably depend on ease of contact between an electrolytic solution and the surface of an electrode formed generally of a carbon fiber nonwoven fabric. As means for facilitating contact between an electrode and an electrolytic solution, mention is made of a method in which the area of an electrode is increased by increasing the amount of the electrode, and a method in which the utilization efficiency of the electrode surface is enhanced. Since an increase in the amount of an electrode leads to an increase in cost, an attempt has been made to enhance the utilization efficiency of the electrode surface.

In a redox flow battery that is generally used, electrochemical cells (hereinafter, referred to as cells) of type in which an electrolytic solution flows in the plane direction of an electrode including a flat plate-shaped carbon fiber nonwoven fabric (flow-through type) are laminated (stacked). However, gaps between carbon fibers in the carbon fiber nonwoven fabric have variations in size, and the electrolytic solution easily flows toward large gaps in the electrode. Thus, there is a problem that the electrolytic solution is easily retained in a region where small gaps are formed.

Geometry control of an electrode is very important as means for ensuring that an electrolytic solution uniformly flows. With regard to the geometry control of an electrode, studies have been heretofore conducted for the purpose of reducing the energy consumption in a pump. For example, Patent Document 1 suggests a technique in which a groove is formed on at least one surface of an electrode. Patent Document 2 suggests a technique in which projections are dispersively formed on at least one surface of an electrode.

In addition, a cell of type in which an electrolytic solution flows through a groove channel formed on the surface of a current collector (flow-by type) is suggested. This type makes it possible to ensure that the energy consumption in a pump can be kept low even when liquid flow-through resistance in an electrode is high because the liquid flows along a cross section overwhelmingly larger in size than the gap in the electrode. However, in a cell of flow-by type, an electrolytic solution slows along the surface of an electrode, and therefore it is difficult for the liquid to flow in the thickness direction of the electrode, so that there is the problem that it is difficult to ensure that the electrolytic solution uniformly flows in the electrode. On the other hand, Patent Document 3 suggests a technique in which a through-hole is formed in the thickness direction of an electrode for reducing electrical conduction resistance with a thin electrode having a high density and facilitating flow of the liquid in the thickness direction of the electrode in a redox flow battery of flow-by type.

PRIOR ART DOCUMENT

Patent Documents

Patent Document 1: Japanese Patent Laid-open Publication No. 8-287923
Patent Document 2: Japanese Patent Laid-open Publication No. 2003-64566
Patent Document 3: U.S. Patent Application Publication No. 2015/0295247

SUMMARY OF THE INVENTION

Problems to be Solved by the Invention

The electrode in which a groove is formed as described in Patent Document 1 has an effect of reducing liquid flow-through resistance, but the groove is formed in parallel to the liquid flow. Thus, the liquid preferentially flows into the groove portion, the surface of the carbon fiber in a portion other than the groove is hardly used, and the effect of improving charge-discharge performance is not sufficient.

In the geometry of the electrode as described in Patent Document 2, since dents (portions other than projections) are continuous in the surface, the electrolytic solution preferentially flows into the dent portions. Therefore, as in the electrode in Patent Document 1, it is difficult to use the surface of the carbon fiber in portions other than the dents, and similarly, the effect of improving the charge-discharge performance is not sufficient.

In the technique in Patent Document 3, improvement of electrical conductivity and reduction of liquid flow-through resistance can be expected, but contact with the electrolytic solution is not sufficient because the electrode has a small thickness, and thus a small surface area.

An object of the present invention is to provide an electrode which is used for a liquid flow-through device and in which liquid flow-through resistance is reduced and the utilization efficiency of the surface of carbon fiber is enhanced. Another object of the present invention is to provide a redox flow battery having excellent charge-discharge performance by use of the electrode which is used for the liquid flow-through device.

Solutions to the Problems

For solving the problems described above, the present invention provides an electrode to be used for a liquid flow-through device, the electrode essentially consisting of a carbon fiber nonwoven fabric, having a thickness of more than 0.40 mm, and having a through-hole disposed therein, or a non-through-hole disposed on one surface or both surfaces of the electrode. A preferred aspect of the present invention is an electrode to be used for a redox flow battery, and the redox flow battery of the present invention has a cell formed using the electrode of the present invention.

Effect of the Invention

In an electrode to be used for a liquid flow-through device according to the present invention, liquid flow-through resistance is reduced, and the utilization efficiency of the surface of carbon fiber is enhanced. Therefore, when the electrode is used for a liquid flow-through device, an efficient chemical reaction can be attained. In addition, when the electrode to be used for a liquid flow-through device according to the present invention is used for a redox flow battery which is a preferred aspect of the present invention, excellent charge-discharge performance can be attained.

BRIEF DESCRIPTION OF THE DRAWING

FIG. 1 is a schematic perspective view of an electrode to be used for a redox flow battery of the present invention.

EMBODIMENTS OF THE INVENTION

[Electrode Used for Liquid Flow-Through Device]

A liquid flow-through device according to the present invention is a device having a liquid and an electrode, the liquid flowing while being in contact with the electrode, and chemically reacting on the surface of the electrode. Examples of the device include liquid flow-through devices such as electrodialysis devices for desalination, salt formation or ion separation, water electrolysis devices for obtaining hydrogen, fuel cells used for power generation, and secondary batteries such as redox flow batteries. Among them, redox flow batteries are typical liquid flow-through devices.

The electrode to be used for a liquid flow-through device according to the present invention is suitably used as an electrode to be used for a redox flow battery. Details of the electrode to be used for a liquid flow-through device according to the present invention will be described with an example of an electrode to be used for the later-described redox flow battery which is a typical liquid flow-through device.

[Electrode Used for Redox Flow Battery]

The electrode to be used for the redox flow battery according to the present invention essentially consists of a carbon fiber nonwoven fabric. The carbon fiber nonwoven fabric is a nonwoven fabric obtained by carbonizing a carbon fiber precursor nonwoven fabric obtained by cutting carbon fiber precursor to about several tens of mm (generally 38 mm to 102 mm), then processing the fiber into a web, and interlacing the fibers by needle punching or water jet processing, or heating and bonding the fibers, or bonding the fibers with a binder. The electrode essentially consisting of a carbon fiber nonwoven fabric may be an electrode including only a carbon fiber nonwoven fabric, but may be an electrode subjected to additional modification with substances which do not hinder a function as an electrode, such as a conduction auxiliary agent such as carbon particles, and a carbide of a resin binder.

Examples of the carbon fiber precursor include rayon fiber, acrylic fiber and lignin fiber, and acrylic fiber (polyacrylonitrile fiber) is preferable from the viewpoint of mechanical strength and cost. In addition, as the carbon fiber precursor, a flameproof thread obtained by subjecting acrylic fiber to heat treatment (flameproofing treatment) in air at 200 to 300° C. may be used. When a flameproof thread is not used, it is preferable to perform flameproofing treatment after forming carbon fiber precursor into a nonwoven fabric.

The carbon fiber precursor nonwoven fabric thus obtained is subjected to heat treatment at 1000 to 3000° C. in an inert atmosphere to obtain a carbon fiber nonwoven fabric.

In addition, in an electrode to be used for a redox flow battery, it is necessary that an electrolytic solution easily come into sufficient contact with the surface of carbon fiber serving as an electrode, and the surface of carbon fiber may be modified to improve the wettability of the electrolytic solution. In this case, as a method for modifying the surface of carbon fiber, air oxidation and electrolytic oxidation, which are excellent from the viewpoint of processability and cost, can be preferably employed. The temperature of the heat treatment and the modification of the surface of carbon fiber are appropriately set in view of battery performance and durability.

The basis weight of the electrode to be used for the redox flow battery of the present invention is preferably 50 to 1000 $g/m^2$, more preferably 100 to 500 $g/m^2$. When the basis weight is less than 50 $g/m^2$, the surface area of the electrode is apt to be insufficient, and when the basis weight is more than 1000 $g/m^2$, productivity is deteriorated.

The electrode to be used for the redox flow battery of the present invention has a thickness of more than 0.40 mm. When the thickness is 0.40 mm or less, the liquid flow-through resistance of the electrolytic solution easily increases. The thickness of the electrode is preferably 0.5 mm or more, more preferably more than 0.60 mm. The upper limit of the thickness of the electrode is not particularly limited, but when the thickness is excessively large, electrical conduction resistance easily increases, and thus the thickness is preferably 10.0 mm or less, more preferably 6.0 mm or less. It is to be noted that the thickness of the electrode herein is a thickness measured with pressure applied over an area of φ5 mm or more at a surface pressure of 0.15 MPa. A plurality of electrodes of the present invention can be laminated when used for a redox flow battery, but it is important to have a large thickness per electrode from the viewpoint of assembly efficiency and electrical conductivity.

Preferably, the electrode to be used for the redox flow battery according to the present invention has a density of 0.40 $g/cm^3$ or more. When the density is high, high electrical conductivity is obtained and the amount of the electrode in the cell is increased, but liquid flow-through easily becomes nonuniform. However, when the uniformization technique according to the present invention is used, it is possible to have both high density and uniformity of liquid flow-through. The density is more preferably 0.50 $g/cm^3$ or more, still more preferably 0.60 $g/cm^3$ or more.

In a first aspect of the electrode to be used for the redox flow battery of the present invention, a through-hole is disposed in the electrode.

The through-hole can be formed by mechanical processing with a piercing member or laser processing. Such processing may be performed on the carbon fiber precursor nonwoven fabric or on the carbon fiber nonwoven fabric after heat treatment. It is preferable that a piercing member having a tapered end is pressed against a carbon fiber precursor nonwoven fabric to form a through-hole because carbon fiber precursor and carbon fiber are hardly broken, so that high mechanical properties are obtained.

The through-hole may be one that can be recognized apart from a gap in the carbon fiber nonwoven fabric itself when a visual field larger in size than a square of 0.5 mm on each side is observed with an optical microscope with transmitted light. In addition, when a through-hole is formed in a regular pattern, transmitted light passing through a gap of the carbon fiber nonwoven fabric itself and transmitted light passing through the through-hole are both observed in image analysis of an image of the carbon fiber nonwoven fabric microscopically observed with transmitted light and photographed, and therefore formation of the through-hole can be confirmed from presence of a plurality of peaks in a distribution of the frequency (area base) of the opening diameter of the gap (region where transmitted light is observed).

In a second aspect of the electrode to be used for the redox flow battery of the present invention, a non-through-hole is disposed on one surface or both surfaces of the electrode.

In this aspect, it is preferable that a non-through-hole is formed on one surface because a flat surface on which a non-through-hole is not formed can be disposed so as to be in contact with a current collector, and therefore electrical conduction resistance can be reduced. In addition, it is preferable that a non-through-hole is formed on each of both surfaces because the amount of the electrolytic solution moving from one surface to the other surface increases, so that the liquid flow-through condition can also be uniformized in the thickness direction.

The depth of the non-through-hole is preferably more than 400 μm, more preferably more than 500 μm, still more preferably more than 600 μm. When the depth of the non-through-hole is 400 μm or less, the effect of the present invention is reduced. Although there is no upper limit on the depth of the non-through-hole, it is preferably 10.0 mm or less, which is the upper limit of the general electrode thickness. The depth of the non-through-hole herein is a depth measured with pressure applied to the non-through-hole-formed surface with an area of φ5 mm or more at a surface pressure of 0.15 MPa.

In addition, the ratio of the depth of the non-through-hole to the thickness (depth of hole/thickness of the hole) is preferably 0.5 or more, more preferably 0.6 or more. This is because the larger the ratio is, the greater the effect of uniformizing liquid flow-through. The upper limit of the depth is not particularly limited, but when the depth is 0.9 or less, the effect of reducing electrical conduction resistance of the surface on which a non-through-hole is not formed is enhanced.

Like the through-hole, such a non-through-hole can be formed by performing mechanical processing with a piercing member or laser processing, and controlling the piercing depth (preventing piercing). Such processing may be performed on the carbon fiber precursor nonwoven fabric or on the carbon fiber nonwoven fabric after heat treatment.

It is preferable that broken fiber is not observed at the peripheral edge portion of the non-through-hole in plan view. This is because when fiber in the vicinity of the non-through-hole is not broken, mechanical properties are improved, and handling is facilitated. Thus, it is preferable that a shaping member having a projection corresponding to the shape of the non-through-hole is pressed against a carbon fiber precursor nonwoven fabric to form the non-through-hole because carbon fiber precursor and carbon fiber are hardly broken. In the electrode to be used for the redox flow battery according to the present invention, it is preferable that broken fiber is not observed in the peripheral edge portion in a majority of through-holes or non-through-holes in plan view. The broken fiber on the peripheral edge portion of the hole is fiber for which observation of any hole with a microscope revels formation of a fiber end along the shape of the hole, e.g. fiber for which five or more fiber ends are observed on the peripheral edge portion of the hole. The peripheral edge portion of the hole in the present invention is a boundary (edge portion) between the non-porous surface and the hole.

The non-through-hole may be one that can be recognized as a macroscopic recess apart from microscopic irregularities developed by fiber itself in the carbon fiber nonwoven fabric when a visual field larger in size than a square of 0.5 mm on each side is observed with an optical microscope with downwardly incident light.

For example, a hole-formed surface is scanned with a shape measuring microscope (downwardly incident light) to capture an image, inclination correction is performed using shape analysis software, portions having a thickness smaller than the size of a surface corresponding to a thickness of an electrode pressurized at a surface pressure of 0.15 MPa are taken as non-through-holes, and an average opening diameter of the non-through-holes is measured, and when this average opening diameter is larger than an average opening diameter obtained by performing image analysis of an image of a carbon fiber nonwoven fabric microscopically observed with transmitted light (average opening diameter of gaps of carbon fiber nonwoven fabric itself), it can be determined that a through-hole is formed. The opening is a diameter calculated from an opening area on the assumption that the hole has a circular shape.

The electrode to be used for the redox flow battery according to the present invention has been described separately as the first aspect and the second aspect for the sake of convenience, but may be one in which both a through-hole and a non-through-hole are formed.

The opening diameter of the through-hole in the first aspect or the non-through-hole in the second aspect (hereinafter, collectively referred to as "hole") is preferably 50 μm or more, more preferably 200 μm or more, still more preferably 500 μm or more. When the opening diameter is larger than the gap size of the non-opening portion, an effect of uniformizing liquid flow-through of the electrolytic solution can be developed. In addition, the opening diameter is preferably 10 mm or less, more preferably 5 mm or less, still more preferably 3 mm or less. The smaller the opening diameter, the easier it is to reduce electrical conduction resistance. The opening diameter mentioned here is a diameter calculated from the opening area on the assumption that the opening has a circular shape. However, the shape of the opening is not limited to a circle, and a square shape, a rectangular shape, or the like can be selected.

The area ratio (opening area/total area) of the holes in plan view of the electrode is preferably 5% or more, more preferably 10% or more. The area ratio (opening/total area) of the holes is preferably 90% or less, more preferably 50% or less. When the area ratio is less than 5%, it is difficult to obtain the effect of the present invention, and when the area ratio is more than 90%, the electrode is apt to have an region which is not pressed against a current collector, and therefore electrical conduction resistance easily increases regardless of whether the current collector is in contact with a surface having a hole or a surface having no hole. The area ratio of holes can be determined in the following manner: a hole-formed surface of the electrode is scanned with a shape measuring microscope to capture an image, inclination correction is performed using shape analysis software, and the area ratio of portions having a thickness smaller than the size of a surface corresponding to a thickness of the electrode pressurized at a surface pressure of 0.15 MPa is calculated.

The electrode to be used for the redox flow battery according to the present invention can be used for both a flow-through type cell and a flow-by type cell, but use of the electrode in a flow-through type cell is one of preferred aspects. The flow-through type is a type in which to an electrode sandwiched between an ion-exchange film and a current collector having no groove, an electrolytic solution is supplied from an end surface of the electrode, so that the electrolytic solution flows in the plane direction inside the electrode. When the electrode is used for a flow-through type cell, the electrolytic solution is spread in a direction other than the liquid feeding direction in a portion of a hole formed on the electrode at the time of passing through the electrode, whereby localization of liquid flow-through paths can be prevented to uniformize liquid flow-through. In a flow-through type redox flow battery, the liquid flow-through path depends on the gap size and arrangement of the electrode, so that localization of the liquid flow-through path easily occurs, and the effect of uniformizing liquid flow-through by the electrode to be used for the redox flow battery according to the present invention is notably obtained.

On the other hand, a flow-by type is one of preferred aspects. The flow-by type is a type in which to an electrode sandwiched between an ion-exchange film and a current collector having a groove, an electrolytic solution is supplied from the groove of the current collector, so that the electrolytic solution flows. When the electrode is used for the flow-by type cell, the electrolytic solution easily moves in the thickness direction of the electrode. In the flow-by type redox flow battery, the electrolytic solution is moved from a groove to a groove in the current collector, so that it is difficult for the electrolytic solution to sufficiently move in the thickness direction especially when the electrode has a large thickness, and the effect of uniformizing liquid flow-through by the electrode to be used for the redox flow battery according to the present invention is notably obtained. The shape of a groove in a current collector which is used for a flow-by type red flow battery and has a groove may be a shape known for a redox flow battery or solid polymer fuel cell, such as a parallel shape, a columnar shape, a serpentine shape or a comb shape.

EXAMPLES

[Measurement Example 1] Electrode Thickness

Using DIGIMICRO MFC-101 (manufactured by Nikon Corporation), the thickness of a sample was measured at each of nine points by a φ5 mm terminal with pressure applied to a measurement terminal portion at 0.15 MPa, and the average thereof was defined as a thickness.

[Measurement Example 2] Morphology of Pores

Using a shape measuring microscope (VR-3050, manufactured by Keyence Corporation), the electrode was scanned from the hole-formed surface side thereof with a visual field at a magnification of 25 times to capture an image, inclination correction was performed using shape analysis software, and a height profile was displayed so as to pass through the bottom portion of the hole, and defined as a representative value of the depth. In addition, the area ratio of portions having thickness smaller than the size of a surface corresponding to the electrode thickness calculated in Measurement Example 1 was determined. The measurement was performed at nine points, and an average thereof was used.

[Measurement Example 3] Presence or Absence of Broken Fiber at Peripheral Edge Portion of Hole When the result of observation with a scanning electron microscope showed that majority of 20 or more adjacent holes had no broken fibers on the peripheral edge portions of the holes, it was determined that there were no broken fibers.

[Measurement Example 4] Discharge Test in Flow-Through Type Cell

The electrode was cut into squares of 9 $cm^2$, a cation-exchange membrane (Nafion NRE-212, manufactured by Du Pont) was disposed between these electrodes, and these electrodes were sandwiched between current collectors having no groove to obtain a single cell of flow-through type. 200 ml of each of 1 M pentavalent or tetravalent vanadium (4 M sulfuric acid) as a positive electrolytic solution and 1 M divalent or trivalent vanadium (4 M sulfuric acid) as a negative electrolytic solution was provided in a tank, and circulated at 5 ml/min. The maximum power density was measured by performing sweeping at a rate of 10 mV/second until the cell voltage reached 0.1 V from a state in which the open circuit voltage was 1.5 V.

[Measurement Example 5] Discharge Test in Flow-by Type Cell

Except that a current collector provided with a one-row serpentine-type groove (groove width: 1 mm, groove depth: 1 mm, rib width: 1 mm) was used to obtain a single cell of flow-by type, the same procedure as in Measurement Example 4 was carried out to measure the maximum power density.

Example 1

A flameproof crimped thread of polyacrylonitrile fiber was cut to a number average fiber length of 51 mm, then formed into a sheet with a card and or cross-layer, and subjected to needle punching at a needle density of 500 threads/$cm^2$ to obtain a carbon fiber precursor nonwoven fabric having an apparent density of 0.10 g/$cm^3$. The carbon fiber precursor nonwoven fabric was pressed with an embossing roll in which square projections having a height of 5.6 mm and a projection portion area of 31 $mm^2$ were dispersively formed with a projection root area ratio of 15%, and heat treatment was then performed at 2400° C. for 15 minutes to obtain an electrode including a carbon fiber nonwoven fabric having a thickness of 6 mm and a basis weight of 600 g/$m^2$, in which a non-through-hole having a depth of 5 mm was disposed with an area ratio of 15%. Broken fiber was not observed at the peripheral edge portion of the hole in plan view.

A discharge test was conducted using this electrode, and the result showed that the maximum power density of the flow-through type cell was 0.20 W/$cm^2$, and the maximum power density of the flow-by type cell was 0.12 W/$cm^2$.

Example 2

A carbon fiber precursor nonwoven fabric prepared in the same manner as in Example 1 was pressed with a pair of flat rolls, and then subjected to heat treatment at 2400° C. for 15 minutes to obtain a carbon fiber nonwoven fabric having a thickness of 6 mm and a basis weight of 600 g/m².

The carbon fiber nonwoven fabric was subjected to laser processing to obtain an electrode in which circular through-holes were dispersively formed with an area ratio of 15% in a plan view with an opening area of 1 mm². In plan view, broken fiber was observed at the peripheral edge portion of the through hole. A discharge test was conducted with a flow-through type cell, and the result showed that the maximum power density was 0.19 W/cm².

Comparative Example 1

Except that press processing with an embossing roll was not performed, the same procedure as in Example 1 was carried out to prepare an electrode. A discharge test was conducted using the electrode, and the result showed that the maximum power density in the flow-through type cell was 0.12 W/cm².

Comparative Example 2

Except that an embossing roll in which ribs having a depth of 5 mm and a width of 1.5 mm were formed at pitches of 1 cm was used, the same procedure as in Example 1 was carried out to prepare an electrode in which grooves having a depth of 5 mm and a width of 1.5 mm were formed at pitches of 1 cm. A discharge test was conducted with a flow-through type cell in such a manner that the liquid flow-through direction was a longitudinal direction, and the result showed that the maximum power density was 0.10 W/cm².

Comparative Example 3

Except that a carbon fiber precursor nonwoven fabric was pressed with an embossing roll in which square dents having a depth of 5.6 mm and a recess portion area of 31 mm² were disposed with an opening area ratio of 15%, the same procedure as in Example 1 was carried out to prepare an electrode in which square projections having a depth of 5 mm and a projection portion area of 25 mm². When a discharge test was conducted with a flow-through type cell, the result showed that the maximum power density was 0.09 W/cm².

Table 1 shows the configurations and maximum power densities of the electrodes prepared in examples and comparative examples, which were measured according to the measurement examples.

Example 3

The same procedure as in Example 1 was carried out until needle punching to prepare a carbon fiber precursor nonwoven fabric, and subsequently pierced with a piercing member in which square projections having a taper formed at the tip thereof and having a height of 3 mm and a cross-sectional area of 31 mm² were dispersively formed with a projection root area ratio of 15%. Thereafter, the carbon fiber precursor nonwoven fabric was subjected to heat treatment at 2400° C. for 15 minutes to obtain an electrode including a carbon fiber nonwoven fabric having a thickness of 0.5 mm and a basis weight of 150 g/m². Broken fiber was not observed at the peripheral edge portion of the through-hole in plan view. A discharge test was conducted with a flow-by type cell, and the result showed that the maximum power density was 0.14 W/cm².

Example 4

Except that the basis weight was twice as large as that in Example 3, the same procedure as in Example 3 was carried out to obtain an electrode including a carbon fiber nonwoven fabric having a thickness of 0.5 mm and a basis weight of 300 g/m². Broken fiber was not observed at the peripheral edge portion of the through-hole in plan view. A discharge test was conducted with a flow-by type cell, and the result showed that the maximum power density was 0.18 W/cm².

Comparative Example 4

Except that the basis weight and the thickness were changed, the same procedure as in Example 2 was carried out to obtain an electrode including a carbon fiber nonwoven fabric having a thickness of 0.2 mm and a basis weight of 90 g/m². In plan view, broken fiber was observed at the peripheral edge portion of the through hole. A discharge test was conducted with a flow-through type cell, and the result showed that it was difficult to feed the liquid because of large liquid flow-through resistance. A discharge test was conducted with a flow-by type cell, and the result showed that the maximum power density was 0.09 W/cm².

Comparative Example 5

Except that a carbon fiber precursor nonwoven fabric was not pierced with a piercing member, the same procedure as in Example 3 was carried out to obtain an electrode including a carbon fiber nonwoven fabric. A discharge test was conducted using the electrode, and the result showed that the maximum power density in the flow-by type cell was 0.08 W/cm².

TABLE 1

| | Thickness | Basis weight | Morphology of pores | Broken fiber on hole peripheral portion | Maximum power density [W/cm²] Flow-through cell | Maximum power density [W/cm²] Flow-by cell |
|---|---|---|---|---|---|---|
| Example 1 | 6 mm | 600 g/m² | Depth: 5 mm, non-through-hole, area ratio: 15% | Absent | 0.20 | 0.17 |
| Example 2 | 6 mm | 600 g/m² | Depth: 6 mm, through-hole, area ratio: 15% | Present | 0.19 | — |
| Comparative Example 1 | 6 mm | 600 g/m² | No hole | Absent | 0.12 | — |
| Comparative Example 2 | 6 mm | 600 g/m² | Depth: 5 mm, groove, area ratio: 15% | Absent | 0.10 | — |

TABLE 1-continued

| | Thickness | Basis weight | Morphology of pores | Broken fiber on hole peripheral portion | Maximum power density [W/cm²] Flow-through cell | Maximum power density [W/cm²] Flow-by cell |
|---|---|---|---|---|---|---|
| Comparative Example 3 | 6 mm | 600 g/m² | Depth 5 mm, projection, area ratio: 85% | Absent | 0.09 | — |
| Example 3 | 0.5 mm | 150 g/m² | Depth: 0.5 mm, through-hole, area ratio: 15% | Absent | — | 0.14 |
| Example 4 | 0.5 mm | 300 g/m² | Depth: 0.5 mm, through-hole, area ratio: 15% | Absent | — | 0.18 |
| Comparative Example 4 | 0.2 mm | 90 g/m² | Depth: 0.2 mm, through-hole, area ratio: 15% | Present | Liquid flow-through difficult | 0.09 |
| Comparative Example 5 | 0.5 mm | 150 g/m² | No hole | Absent | — | 0.08 |

The invention claimed is:

1. An electrode, the electrode essentially consisting of a carbon fiber nonwoven fabric, having a thickness of more than 0.4 mm, and having a non-through-hole having a depth of more than 400 µm disposed on one surface or both surfaces of the electrode.

2. A redox flow battery comprising a cell form using the electrode according to claim 1.

3. The electrode according to claim 1, which has a thickness of more than 0.60 mm.

4. The redox flow battery according to claim 2, wherein the redox flow battery is a flow-through type redox flow battery.

5. The redox flow battery according to claim 2, wherein the redox flow battery is a flow-by type redox flow battery.

6. The redox flow battery according to claim 2, wherein a non-through-hole having a depth of more than 400 µm is disposed on both surfaces of the electrode.

7. The redox flow battery according to claim 2, wherein broken fiber is not observed in a peripheral edge portion of the non-through-hole in plan view.

8. The electrode according to claim 1, wherein broken fiber is not observed in a peripheral edge portion of the non-through-hole in plan view.

9. The redox flow battery according to claim 2, wherein an opening diameter of the non-through-hole is 50 µm to 10 mm.

10. The electrode according to claim 1, wherein an opening diameter of the non-through-hole is 50 µm to 10 mm.

11. The redox flow battery according to claim 2, wherein an area ratio (opening area/total area) of the non-through-hole is 5 to 50% in plan view.

12. The electrode according to claim 1, wherein an area ratio (opening area/total area) of the non-through-hole is 5 to 50% in plan view.

* * * * *